United States Patent [19]

Lorenz et al.

[11] 4,129,709
[45] Dec. 12, 1978

[54] COATING COMPOSITION COMPRISING N-VINYL-2-PYRROLIDONE AND AN OLIGOMER

[75] Inventors: Donald H. Lorenz, Basking Ridge; Shu-Tung Tu, East Brunswick, both of N.J.

[73] Assignee: GAF Corporation, New York, N.Y.

[21] Appl. No.: 777,031

[22] Filed: Mar. 14, 1977

[51] Int. Cl.$^2$ .......................................... C08F 120/02
[52] U.S. Cl. .................................. 526/264; 526/263; 526/304; 204/159.23
[58] Field of Search ....................... 106/287 R, 35, 20; 260/77.5 AM, 77.5 CR, 895; 526/263, 264; 204/159.19, 159.23, 159.22

[56] References Cited

U.S. PATENT DOCUMENTS

| 3,425,999 | 2/1969 | Axelrod et al. | 260/77.5 AM |
| 3,829,531 | 8/1974 | Graff | 260/859 R |

Primary Examiner—Hosea E. Taylor
Assistant Examiner—W. Thompson
Attorney, Agent, or Firm—Walter C. Kehm; Joshua J. Ward

[57] ABSTRACT

A coating composition comprising;
A. an oligomer of Formula I:

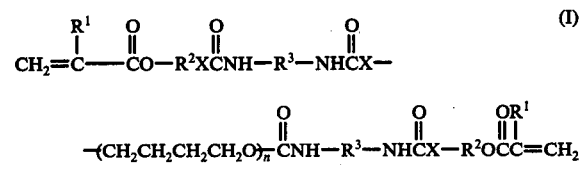

wherein:
R$^1$ is hydrogen or methyl;
R$^2$ is lower alkylene;
R$^3$ is aliphatic or cycloaliphatic;
X is —O— or —NH—;
n is an integer from 2 to 50 inclusive;
B. N-vinyl-2-pyrrolidone;
C. an acrylic acid ester having a boiling point of at least 200° C at 760 mm Hg.

8 Claims, No Drawings

COATING COMPOSITION COMPRISING N-VINYL-2-PYRROLIDONE AND AN OLIGOMER

Coating compositions which are curable under the influence of radiation in general and ultra-violet light in particular as well as electron beam curing are well known. Representative examples of prior coating compositions include those disclosed in U.S. Pat. Nos. 3,782,961; 3,829,531; 3,850,770; 3,874,906; 3,864,133; 3,891,523; 3,895,171; 3,899,611; 3,907,574; 3,912,516; 3,932,356; and 3,989,609. Unfortunately, these coating compositions suffer from a number of disadvantages. Many of these coating compositions have insufficient flexibility that causes them to crack when applied to flexible substrates such as those of leather or a polyvinyl plastisol. Other compositions do not adhere sufficiently to the substrate with the undesirable result that they become dislodged and peel. Still other coating compositions require the use of solvents that must be evaporated during the curing process. The evaporation of such solvents consumes energy and creates atmospheric pollution problems. Still other compositions produce coatings that have insufficient scratch-resistance, stain-resistance, abrasion-resistance, and/or solvent-resistance.

Accordingly it is an object of the present invention to provide an improved coating composition that is substantially free of one or more of the disadvantages of prior coating compositions. Another object is to provide a coating composition that is flexible.

Still another object is to provide a coating composition that tenaciously adheres to the coated substrate.

Yet another object is to provide a coating composition that is free of volatile solvents.

Yet another object is to provide a coating composition that will produce a coating that is scratch-resistant, strain-resistant, abrasion-resistant, and solvent-resistant.

Another object is to provide an improved process for coating substrates such as those of natural leather, synthetic leather, polyvinyl chloride, polyurethanes and polycarbonates.

Other objects and advantages of the present invention will be apparent to those skilled in the art by reference to the following detailed description.

The above and other objects are accomplished according to the present invention by providing a coating composition comprising:

A. an oligomer of Formula I:

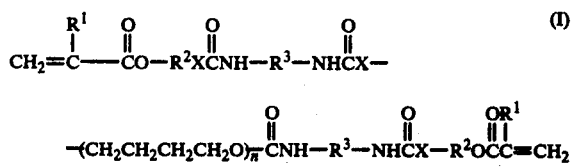

wherein:
$R^1$ is hydrogen or methyl;
$R^2$ is lower alkylene;
$R^3$ is aliphatic or cycloaliphatic;
X is —O— or —NH—;
$n$ is an integer from 2 to 50 inclusive;
B. N-vinyl-2-pyrrolidone;
C. an acrylic acid ester having a boiling point of at least 200° C. at 760 mm Hg.

The oligomers of the present invention are produced by reacting polytetrahydrofuran with a diisocyanate to produce an isocyanate terminated prepolymer. The isocyanate terminated prepolymer is then capped with a capping agent to produce the oligomer of Formula I. The preferred oligomers of Formula I are those of Formula II:

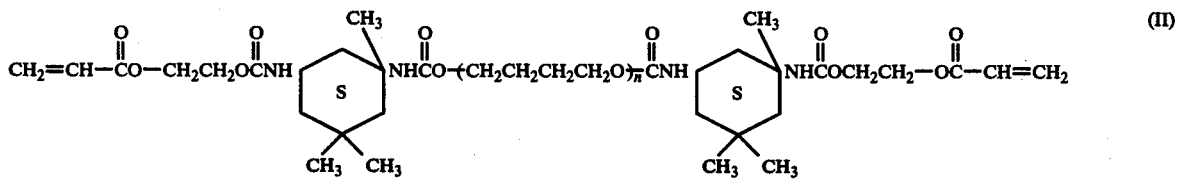

wherein "$n$" is an integer from 5 to 20 inclusive.

The polytetrahydrofuran is commercially available from the Du Pont Company under the tradenames "TERRECOL-650", "TERRECOL-1000", and "TERRECOL-2000", and from the Quaker Oats Company under the tradenames "POLYMEG-650", "POLYMEG-1000", and "POLYMEG-2000". In the above tradenames the number indicates the approximate molecular weight of the polytetrahydrofuran. The most preferred polytetrahydrofuran is that having a molecular weight of 650 which is consistent with the definition of "$n$" in Formulas I and II herein. At higher molecular weights wherein "$n$" exceeds about 50 the resultant oligomer has too high a viscosity.

The capping agents useful in the present invention are those that will react with the isocyanate terminated prepolymer to produce the oligomers of Formula I. In general, any capping agent having a terminal amine or hydroxyl group and also having an acrylic acid or methacrylic acid moiety is suitable. Examples of suitable capping agents include among others hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, hydroxyhexyl methacrylate, aminoethyl acrylate, and aminoethyl methacrylate.

The diisocyanates useful to produce oligomers of Formula I are aliphatic and cycloaliphatic diisocyanates that will react with terminal hydroxyl groups present on the polytetrahydrofuran. Of course, aromatic diisocyanates undergo the same reaction but do not yield a product as satisfactory as that obtained by the use of aliphatic diisocyanates. Examples of suitable diisocyanates include among others, isophorone diisocyanate, 4,4'-dicyclohexylmethane-diisocyanate available commercially from the Dupont Company under the trade name "Hylene W," and trimethylhexamethylene-diisocyanate, 1,6 hexamethylene diisocyanate, 2,4,4 trimethyl 1,6 hexylene diisocyanate, octadecylene diisocyanate and 1,4 cyclohexylene diisocyanate. The preferred diisocyanates are isophorone diisocyanate (3-isocyanatomethyl 3,5,5 trimethyl cyclohexyl isocyanate) and 4,4' diicyclohexylmethane-diisocyanate.

The N-vinyl-2-pyrrolidone is a necessary ingredient of the coating composition of the present invention. The weight ratio of oligomer to N-vinyl-2-pyrrolidone can vary widely as long as the properties of the resultant cured coating composition are not adversely affected, however, they are generally present in a weight ratio of 1:9 to 9:1 and preferably 1:3 to 3:1. At higher ratios, e.g., those rich in oligomer, the uncured coating composition tends to have too high a viscosity. This high viscosity makes it difficult to apply the uncured coating composition to the substrate. At lower ratios the resultant cured coating composition tends to be too hard and inflexible.

The coating compositions of the present invention must also contain an acrylic acid ester having a boiling point of at least 200° C. at 760 mm Hg. Acrylic acid esters of lower boiling points tend to vaporize during curing. Such vaporization causes undesirable changes in the coating composition. Furthermore, vaporized acrylic acid esters tend to polymerize on the curing source, e.g., ultra-violet lamps or electron beam window employed in curing. This polymerization reduces the output of the source. This vaporization also causes undesirable atmospheric pollution. The acrylic acid esters useful in the present invention include, among others, monoesters, diesters and higher esters of both acrylic acid and methacrylic acid. Examples of suitable acrylic acid esters include, among others, 1,4-butanedioldiacrylate, 1,6-hexanedioldiacrylate, neopentylglycoldiacrylate, pentaerythritoltetramethacrylate, trimethylolpropane-triacrylate, ethylhexylacrylate, ethylhexyl-methacrylate, pentyl-acrylate, hexyl-acrylate, and cyclohexyl-methacrylate. 1,4-butanedioldiacrylate and 1,6 hexandioldiacrylate are the preferred acrylic acid esters.

The acrylic acid ester can be present in the coating composition in widely varying amounts but is generally present in a weight ratio of 1:9 to 9:1 and preferably 1:3 to 3:1 compared to the oligomer of Formula I.

If the curing is done with ultra-violet light a photo-initiator is used. Suitable photo-initiators include vicinal ketaldonyl compounds (i.e., compounds containing a ketone group and an aldehyde group) such as diacetyl, benzil, 2,3-pentanedione, 2,3-octanedione,1-phenyl-1,2-butanedione, 2,2-dimethyl-4-phenyl-3,4-butanedione, phenyl-glyoxal, diphenyl-triketone; aromatic diketones, such as anthraquinone; acyloins, such as benzoin; pivaloin acryloin ethers, such as benzoin-methyl-ether, benzoin-ethyl-ether, benzoin-butyl-ether, benzoin-isobutyl-ether, benzoin-phenyl-ether; alpha-hydrocarbon substituted aromatic acryloins, including alpha-methyl-methyl-benzoin, alpha-alkyl-benzoin, as in U.S. Pat. No. 2,722,512, and phenylbenzoin; diaryl ketones, such as benzophenone and dinaphthyl ketone; and organic disulfides, such as diphenyldisulfide. The photo-initiator can also include a synergistic agent, such as a tertiary amine, to enhance the conversion of photo-absorbed energy to polymerization initiating free radicals. Diethoxyacetophenone available from Union Carbide Corp., dimethoxyphenylacetophenone such as IRGACURE 651 available from Ciba-Geigy or a benzoin ether such as Vicure 10 available from Stauffer Chemical Co. are preferred. The photo-initiator is present in the coating composition in an amount sufficient to initiate the desired polymerization under the influence of the amount of actinic light energy absorbed. The coating composition generally contains from 0.01 to 5 weight percent of photo-initiator based on the weight of the coating composition.

The coating composition can also contain an addition polymerization inhibitor to prevent undesirbale autopolymerization of the coating composition in storage prior to use. Examples of suitable addition polymerization inhibitors include, among others di(1,4 secbutyl amino) benzene available from the Dupont Company under the trade name "Anti-Oxidant 22" and phenothiazine available from Tefenco Chemical Co. The addition polymerization inhibitor is present in an amount sufficient to prevent autopolymerization and is generally present in an amount from 0.01 to 2% based on the weight of the coating composition.

The coating composition can also contain a surfactant. The preferred surfactants are silicone surfactants such as that available from the Dow Corning Corporation under the trade name "DC-193". The surfactant is present in an amount necessary to reduce the surface tension of the coating composition and reduce its viscosity to the desired level. The surfactant generally comprises from 0.1 to 5 weight percent based on the weight of the coating composition.

The coating compositions of the present invention can also contain other conventional additives, such as flow control and leveling agents, organic and inorganic dyestuffs and pigments, fillers, plasticizers, lubricants, and reinforcing agents, such as alumina, silica, clay, talc, powdered glass, carbon black and fiberglass.

The coating compositions of the present invention can be cured by applying them as a film 0.5 mil. thick on the substrate. Curing is preferably done under an inert atmosphere of nitrogen. The coating composition may be applied as a thin film in any conventional manner such as by spraying, brushing, dipping, roll coating and the like.

Conventionally, the film on the substrate is positioned to travel on a conveyor and pass under a source of a free radical generator, such as radiation. The coated side of the substrate is exposed to the radiation for a time sufficient to effect polymerization and convert the film into an adherent, tough, flexible coating.

As used herein the term radiation refers to any radiation source which will produce free radicals and induce addition polymerization of vinyl bonds. The actinic radiation is suitably in the wave length of 2000–7500 A, preferably 2000 to 4000 A. A class of actinic light useful herein is ultra-violet light and other forms of actinic radiation are from the sun, artifical sources such as Type RS sunlamps, carbon arc lamps, Xenon arc lamps, mercury vapor lamps, tungsten halide lamps, lasers, fluorescent lamps with ultra-violet light emitting phosphors.

The preferred electron beam system contains a wide curtain of electrons directly from a linear cathode. A curtain of electrons from the gun's cathode, accelerated to a high velocity by a 200 KV potential, emerges from the chamber through a foil window into the coated substrates (Electroncurtain ™ by Energy Sciences, Inc.)

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

The following abbreviations are used in the following examples and tables:

THF polytetrahydrofuran

NP N-vinyl-2 pyrrolidone
B,DDA 1,4 butanedioldiacrylate
IPDI isophorone diisocyanate
TMDI trimethyl hexamethylene diisocyanate
Hylene W 4,4' dicyclohexylmethane diisocyanate
HEA hydroxyethyl acrylate
HEMA hydroxyethyl methacrylate

EXAMPLE 1

This example is illustrative of forming the inventive coating composition. The following quantities of the following items were combined as indicated below:

| ITEM | NAME | QUANTITY (gms) | QUANTITY (mols) |
|------|------|----------------|-----------------|
| A | THF | 356 | 0.55 |
| B | NP | 173.3 | 1.55 |
| C | B,DDA | 121.7 | 0.53 |
| D | IPDI | 267 | 1.34 |
| E | HEA | 139 | 1.2 |

The following procedure was used: The reaction was carried out under dry air. Items B, C and D are added to a reactor equipped with a mechanical stirrer, a reflux condenser and two separatory funnels. Phenothiazine (60 ppm) is added. This mixture is agitated vigorously at a temperature of 45° C. At this point, 2.4 ml. of a 10 weight percent solution of catalyst of dibutyl tin dilaurate in ethylhexyl acrylate is injected. The temperature is raised to 50° ± 2° C. and A is added dropwise from a separatory funnel. This addition takes approximately 40 min. Another 1.6 ml. of the catalyst is then injected and the temperature is raised to 56° ± 2° C., where it is kept for 2 hours. The temperature of the reaction mixture is lowered to 50° ± 2° C. and Item E is added dropwise from the other funnel. The addition takes about 45 min. to complete. The temperature is raised to 56° ± 2° C. where it is kept for 3 hrs. At the end of the reaction DC-193, silicone oil (1% on the product weight) is mixed in. The product is stored in an amber glass bottle at the ambient temperature. For electron beam curing, the product is ready for use. For ultra-violet light curing, a photo-initiator is added and mixed well before use.

EXAMPLES 2-4

These examples are illustrative of forming the inventive coating compositions. Table I shows the amounts of ingredients combined in the examples. The procedure of Example 1 was followed substituting the specified amounts of ingredients as shown in Table I. The amounts of ingredients in Example 1 are also shown in Table I for convenience.

TABLE I

| EXAMPLE | 1 Parts | 1 Mols | 2 Parts | 2 Mols | 3 Parts | 3 Mols | 4 Parts | 4 Mols |
|---------|---------|--------|---------|--------|---------|--------|---------|--------|
| THF | 356 | 0.55 | 356 | 0.55 | 356 | 0.55 | 356 | 0.55 |
| NP | 173.3 | 1.55 | 186.3 | 1.67 | 190.3 | 1.7 | 172.1 | 1.54 |
| B,DDA | 121.7 | 0.53 | 128.6 | 0.56 | 131.6 | 0.57 | 119.5 | 0.52 |
| diisocyanate | 267 (IPDI) | 1.34 | 315 (Hylene W) | 1.18 | 315 (Hylene W) | 1.18 | 253 (TMDI) | 1.44 |
| capping agent | 139 (HEA) | 1.2 | 139 (HEA) | 1.2 | 156 (HEMA) | 1.2 | 139 (HEA) | 1.2 |

EXAMPLE 5

This example illustrates the synthesis of a coating composition of the present invention employing two acrylic acid esters.

The procedure of Example 1 is repeated employing the same times, conditions and ingredients except that one-half the quantity of mols of the B,DDA is replaced with ethylhexylacrylate with similar results.

EXAMPLE 6

To the composition of Example 4 is added 2% of a benzoin ether (Vicure 10 available from Stauffer Chemical) and a 1-mil thick film is applied on a vinyl sheet. The coated vinyl sheet is cured by passing through a PPG QC Lab UV oven containing two 200 w/in. UV lamps at a speed of 100 ft/min. No solvent was left after the cure. The coating is dry, flexible, scratch-resistant, stain-resistant, abrasion-resistant and solvent-resistant.

The product has been shown to give coatings with good hand on fabrics. The elongation of the cured film is in the order of 20-50% with a tensile strength of about 3500 psi. These materials have good adhesion to vinyl, urethane and polycarbonate substrates as well as to natural fibers.

Although the invention has been described in considerable detail with reference to certain preferred embodiments thereof, it will be understood that variations and modifications can be effected within the spirit and scope of the invention as described above and as defined in the appended claims.

What is claimed is:

1. A coating composition comprising;
A. an oligomer of Formula I:

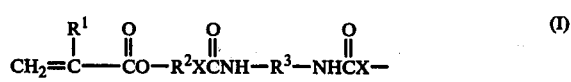

wherein:
$R^1$ is hydrogen or methyl;
$R^2$ is lower alkylene;
$R^3$ is saturated aliphatic or cycloaliphatic;
X is —O— or —NH—;
n is an integer from 2 to 50 inclusive;
B. N-vinyl-2-pyrrolidone;
C. an acrylic acid ester having a boiling point of at least 200° C. at 760 mm Hg,
wherein the weight ratio A:B is from 1:9 to 9:1; and
wherein the weight ratio A:C is from 1:9 to 9:1.

2. The coating composition of claim 1 further comprising an addition polymerization inhibitor present in an amount sufficient to avoid the auto-polymerization of the composition during storage.

3. The coating composition of claim 2 wherein the addition polymerization inhibitor is present in an amount from 0.01 to 2 weight percent based upon the weight of the composition.

4. The coating composition of claim 1 further comprising a photo-initiator present in an amount sufficient to initiate the desired polymerization under the influence of the amount of actinic light energy absorbed.

5. The coating composition of claim 4 wherein the photo-initiator is present in an amount from 0.01 to 5 weight percent based upon the weight of the composition.

6. A coating composition of claim 1 which is photo-polymerizable in the presence of ultra-violet light to produce an adherent coating that is flexible, scratch-resistant, stain-resistant, abrasion-resistant, and solvent-resistant, said coating composition consisting essentially of;

A. an oligomer of Formula II:

$$\text{CH}_2=\text{CH}-\overset{\overset{\text{O}}{\|}}{\text{C}}\text{O}-\text{CH}_2\text{CH}_2\text{OCNH}-\underset{\underset{\text{CH}_3\ \text{CH}_3}{}}{\overset{\overset{\text{CH}_3}{|}}{\text{S}}}-\text{NHCO}-(\text{CH}_2\text{CH}_2\text{CH}_2\text{CH}_2\text{O})_{\overline{n}}\overset{\overset{\text{O}}{\|}}{\text{C}}\text{NH}-\underset{\underset{\text{CH}_3\ \text{CH}_3}{}}{\overset{\overset{\text{CH}_3}{|}}{\text{S}}}-\text{NHCOCH}_2\text{CH}_2-\text{OC}-\text{CH}=\text{CH}_2$$ (II)

wherein "n" is 5 to 20
B. N-vinyl-2-pyrrolidone;
C. 1-4 butanedioldiacrylate
D. a photo-initiator present in an amount from 0.01 to 5 weight percent based on the weight of the composition;
E. an addition polymerization inhibitor present in an amount from 0.01 to 2 weight percent based on the weight of the composition;
wherein the ratio A:B is from 1:3 to 3:1; and
wherein the ratio A:C is from 1:3 to 3:1.

7. A process for coating a substrate comprising in sequence the steps of:
I. contacting the substrate with a coating composition comprising:
A. an oligomer of Formula I:

$$\text{CH}_2=\overset{\overset{R^1}{|}}{\text{C}}-\overset{\overset{\text{O}}{\|}}{\text{C}}\text{O}-R^2\text{XCNH}-R^3-\text{NHCX}-(\text{CH}_2\text{CH}_2\text{CH}_2\text{CH}_2\text{O})_{\overline{n}}\overset{\overset{\text{O}}{\|}}{\text{C}}\text{NH}-R^3-\text{NHCX}-R^2\text{OCC}=\text{CH}_2$$ (I)

wherein:
R$^1$ is hydrogen or methyl;
R$^2$ is lower alkylene;
R$^3$ is aliphatic or cycloaliphatic;
X is —O— or —NH;
n is an integer from 2 to 50 inclusive;
B. N-vinyl-2-pyrrolidone;
C. an acrylic acid ester having a boiling point of at least 200° C. at 760 mm Hg. and a photo-initiator to form a coated substrate,
II. exposing the coated substrate to radiation until an adherent dry polymerized coating is formed on the substrate.

8. A coating composition comprising:
A. an oligomer of Formula I:

$$\text{CH}_2=\overset{\overset{R^1}{|}}{\text{C}}-\overset{\overset{\text{O}}{\|}}{\text{C}}\text{O}-R^2\text{XCNH}-R^3-\text{NHCX}-(\text{CH}_2\text{CH}_2\text{CH}_2\text{CH}_2\text{O})_{\overline{n}}\overset{\overset{\text{O}}{\|}}{\text{C}}\text{NH}-R^3-\text{NHCX}-R^2\text{OCC}=\text{CH}_2$$ (I)

wherein:
R$^1$ is a hydrogen or methyl;
R$^2$ is lower alkylene wherein the number of carbon atoms is 2–6;
R$^3$ is saturated aliphatic or cycloaliphatic wherein the number of carbon atoms is 6–17;
X is —O— or —NH—;
n is an integer from 2 to 50 inclusive;
B. N-vinyl-2-pyrrolidone;
C. an acrylic acid ester selected from the group consisting of:
1,4-butanedioldiacrylate, 1,6-hexanedioldiacrylate, neopentylglycoldiacrylate, pentaerythritoltetramethacrylate, trimethylolpropane-triacrylate, ethylhexylacrylate, ethylhexyl-methacrylate, pentylacrylate, hexyl-acrylate, and cyclohexyl-methacrylate,
wherein the weight ratio A:B is from 1:9 to 9:1; and
wherein the weight ratio A:C is from 1:9 to 9:1.

* * * * *